(12) United States Patent
Hanley et al.

(10) Patent No.: US 10,530,638 B2
(45) Date of Patent: Jan. 7, 2020

(54) MANAGING CONNECTIVITY FOR CRITICAL PATH NODES (71) Applicant: LANDIS+GYR INNOVATIONS, INC., Alpharetta, GA (US)

(72) Inventors: James Patrick Hanley, Decatur, GA (US); Lawrence Harris, Duluth, GA (US); Christopher Scott Hett, Smyrna, GA (US)

(73) Assignee: Landis+ Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 15/974,499

(22) Filed: May 8, 2018

(65) Prior Publication Data
US 2019/0349245 A1 Nov. 14, 2019

(51) Int. Cl.
H04W 24/04 (2009.01)
H04L 12/24 (2006.01)
H04L 12/707 (2013.01)
H04L 12/26 (2006.01)
H04L 12/703 (2013.01)
H04W 84/20 (2009.01)

(52) U.S. Cl.
CPC ...... H04L 41/0668 (2013.01); H04L 43/0817 (2013.01); H04L 45/22 (2013.01); H04L 45/28 (2013.01); H04W 24/04 (2013.01); H04W 84/20 (2013.01)

(58) Field of Classification Search
CPC . H04L 41/0672; H04L 45/28; H04L 41/0668; H04L 45/22; H04L 43/0817; H04W 24/04; H04W 84/20

USPC .......................................................... 370/225
See application file for complete search history.

(56) References Cited

U.S. PATENT DOCUMENTS

| 6,735,630 | B1 | 5/2004 | Gelvin et al. |
| 7,502,354 | B1 | 3/2009 | Maufer |
| 7,802,015 | B2 | 9/2010 | Cheifot et al. |
| 7,835,301 | B1 | 11/2010 | Maufer |
| 7,978,691 | B1 | 7/2011 | Cole |

(Continued)

FOREIGN PATENT DOCUMENTS

| EP | 2330776 | 6/2011 |
| EP | 2901657 | 8/2015 |

(Continued)

OTHER PUBLICATIONS

Alvi et al., On Route Maintenance and Recovery Mechanism of RPL, 13th International Wireless Communications and Mobile Computing Conference (IWCMC), IEEE, 2017, pp. 1933-1938.

(Continued)

Primary Examiner — Faisal Choudhury
(74) Attorney, Agent, or Firm — Kilpatrick Townsend & Stockton LLP (57) ABSTRACT Systems and methods for managing nodes in mesh networks are provided. A critical node may determine a status of a backhaul connection prior to joining a PAN. A critical path may be created and maintained that includes the critical node and any intervening nodes between the critical node and the root. A critical node may switch PANs when a backhaul connection becomes unavailable. The switch may be facilitated by a node on the critical path other than the critical node. A node may switch PANs and coordinate the switch with its child nodes.

17 Claims, 5 Drawing Sheets

(56) References Cited

U.S. PATENT DOCUMENTS

| | | |
|---|---|---|
| 8,095,172 B1 | 1/2012 | Cole et al. |
| 8,244,249 B1 | 8/2012 | Everson et al. |
| 8,571,005 B1 | 10/2013 | Vleugels et al. |
| 8,693,453 B2 | 4/2014 | Priyantha et al. |
| 8,891,497 B1 | 11/2014 | Vleugels |
| 9,270,761 B1 | 2/2016 | Logue et al. |
| 9,622,089 B1 | 4/2017 | Ngo et al. |
| 9,692,658 B2 | 6/2017 | Guo et al. |
| 9,699,708 B2 | 7/2017 | Alexander et al. |
| 9,860,677 B1 | 1/2018 | Agerstam et al. |
| 10,045,290 B2 | 8/2018 | Vleugels et al. |
| 10,277,686 B2 | 4/2019 | Bhandari et al. |
| 10,313,197 B1 | 6/2019 | Stamatakis |
| 10,356,618 B2 | 7/2019 | Conant et al. |
| 10,383,018 B2 | 8/2019 | Cheng et al. |
| 10,404,572 B1 | 9/2019 | Fuste Vilella et al. |
| 10,405,319 B2 | 9/2019 | Shao et al. |
| 2004/0151193 A1 | 8/2004 | Rune et al. |
| 2005/0015644 A1 | 1/2005 | Chu et al. |
| 2006/0116170 A1 | 6/2006 | Brahmbhatt et al. |
| 2006/0215601 A1 | 9/2006 | Vleugels et al. |
| 2007/0140239 A1 | 6/2007 | Bauer et al. |
| 2007/0171859 A1 | 7/2007 | Brahmbhatt et al. |
| 2007/0211681 A1 | 9/2007 | Sun et al. |
| 2007/0254604 A1 | 11/2007 | Kim |
| 2008/0070614 A1 | 3/2008 | Ogushi et al. |
| 2009/0059816 A1 | 3/2009 | Reza et al. |
| 2009/0122733 A1 | 5/2009 | Ruy et al. |
| 2009/0252134 A1 | 10/2009 | Schlicht et al. |
| 2010/0124196 A1 | 5/2010 | Bonar et al. |
| 2010/0177660 A1 | 7/2010 | Essinger et al. |
| 2010/0177703 A1 | 7/2010 | Dacosta et al. |
| 2010/0208662 A1 | 8/2010 | Fuste et al. |
| 2011/0116414 A1 | 5/2011 | Lee et al. |
| 2011/0149720 A1 | 6/2011 | Phuah et al. |
| 2011/0176464 A1 | 7/2011 | Warner et al. |
| 2011/0176469 A1 | 7/2011 | Kim et al. |
| 2012/0026890 A1 | 2/2012 | Banka et al. |
| 2012/0117268 A1* | 5/2012 | Shaffer .......... H04L 45/24 709/238 |
| 2012/0155463 A1 | 6/2012 | Vasseur et al. |
| 2012/0158981 A1 | 6/2012 | Desai et al. |
| 2012/0290730 A1 | 11/2012 | Desai et al. |
| 2013/0163407 A1* | 6/2013 | Sinha .......... H04W 40/12 370/217 |
| 2014/0029434 A1 | 1/2014 | Wang et al. |
| 2014/0092753 A1 | 4/2014 | Vasseur et al. |
| 2014/0098685 A1 | 4/2014 | Shattil |
| 2014/0126423 A1 | 5/2014 | Vasseur et al. |
| 2014/0219133 A1* | 8/2014 | Dasgupta .......... H04L 49/9057 370/254 |
| 2014/0281670 A1 | 9/2014 | Vasseur et al. |
| 2014/0376405 A1 | 12/2014 | Erickson et al. |
| 2015/0023155 A1* | 1/2015 | Shanmugavadivel .. H04L 45/28 370/225 |
| 2015/0023205 A1 | 1/2015 | Vasseur et al. |
| 2015/0092530 A1* | 4/2015 | Kelsey .......... H04W 40/244 370/216 |
| 2015/0109961 A1 | 4/2015 | Patil et al. |
| 2015/0124650 A1* | 5/2015 | Misra .......... H04W 74/00 370/254 |
| 2015/0156738 A1 | 6/2015 | Guo et al. |
| 2015/0163828 A1 | 6/2015 | Vandwalle et al. |
| 2015/0181309 A1 | 6/2015 | Shepherd et al. |
| 2015/0186642 A1 | 7/2015 | Cruz Mota et al. |
| 2015/0200810 A1 | 7/2015 | Vasseur et al. |
| 2015/0304920 A1 | 10/2015 | Cootey |
| 2015/0319555 A1 | 11/2015 | Cordeiro et al. |
| 2015/0327261 A1 | 11/2015 | Thubert et al. |
| 2015/0372875 A1* | 12/2015 | Turon .......... H04W 76/10 370/254 |
| 2015/0382275 A1 | 12/2015 | Pragada et al. |
| 2016/0006837 A1 | 1/2016 | Reynolds et al. |
| 2016/0021013 A1 | 1/2016 | Vasseur et al. |
| 2016/0021017 A1 | 1/2016 | Thubert et al. |
| 2016/0044522 A1 | 2/2016 | Ludlow et al. |
| 2016/0066183 A1 | 3/2016 | Conant et al. |
| 2016/0094398 A1 | 3/2016 | Choudhury et al. |
| 2016/0112518 A1 | 4/2016 | Haleem et al. |
| 2016/0112941 A1 | 4/2016 | Desai et al. |
| 2016/0128043 A1 | 5/2016 | Shuman et al. |
| 2016/0134468 A1 | 5/2016 | Hui et al. |
| 2016/0164725 A1 | 6/2016 | Wu et al. |
| 2016/0309330 A1 | 10/2016 | Moon |
| 2017/0041954 A1 | 2/2017 | Tsai et al. |
| 2017/0070993 A1 | 3/2017 | Ngo et al. |
| 2017/0111846 A1 | 4/2017 | Kang |
| 2017/0150368 A1 | 5/2017 | Ngo et al. |
| 2017/0155703 A1 | 6/2017 | Hao et al. |
| 2017/0156149 A1 | 6/2017 | Lin et al. |
| 2017/0195136 A1 | 7/2017 | Ghosh et al. |
| 2017/0257129 A1 | 9/2017 | Egner et al. |
| 2017/0273002 A1 | 9/2017 | Chen et al. |
| 2017/0279829 A1 | 9/2017 | Vasseur et al. |
| 2017/0347283 A1 | 11/2017 | Kodaypak |
| 2017/0359148 A1 | 12/2017 | Richardson et al. |
| 2017/0374560 A1 | 12/2017 | Judge et al. |
| 2018/0026891 A1 | 1/2018 | Vasseur et al. |
| 2018/0123963 A1 | 5/2018 | Thubert et al. |
| 2018/0167948 A1 | 6/2018 | Egner et al. |
| 2018/0176853 A1 | 6/2018 | Chen et al. |
| 2018/0213460 A1* | 7/2018 | Adella .......... H04W 40/24 |
| 2018/0316746 A1 | 11/2018 | Shattil |
| 2018/0376400 A1 | 12/2018 | Chaki et al. |
| 2019/0246444 A1 | 8/2019 | Kanzaki et al. |

FOREIGN PATENT DOCUMENTS

| | | |
|---|---|---|
| WO | 2006138122 | 12/2006 |
| WO | 2012109478 | 8/2012 |

OTHER PUBLICATIONS

Chen et al., Service-Aware Node Migration for Low-Power and Lossy Networks, IP.Com Journal, IP.Com Inc., Nov. 2, 2017, 15 pages.

International Application No. PCT/US2019/027798, International Search Report and Written Opinion dated Jun. 27, 2019, 16 pages.

International Application No. PCT/US2019/029813, International Search Report and Written Opinion dated Jul. 8, 2019, 14 pages.

Winter et al., RPL: IPv6 Routing Protocol for Low-Power and Lossy Networks, draft-ietf-roll-rpl-18.txt, Feb. 4, 2011 Internet Engineering Task Force, IETF, XP015073823, Feb. 4, 2011, pp. 1-80.

Ancillotti et al., "RPL Routing Protocol in Advanced Metering Infrastructures: An Analysis of the Unreliability Problems", Sustainable Internet and ICT for Sustainability (SustainIT), Oct. 4, 2012, pp. 1-10.

PCT Patent Application No. PCT/US2019/030138, PCT International Search Report and Written Opinion, dated Aug. 28, 2019, 13 pages.

U.S. Appl. No. 15/974,520, Notice of Allowance, dated Sep. 4, 2019.

U.S. Appl. No. 15/974,541, Non-Final Office Action, dated Sep. 18, 2019, 28 pages.

* cited by examiner

MANAGING CONNECTIVITY FOR CRITICAL PATH NODES

CROSS-REFERENCE TO RELATED APPLICATIONS

This application is related to U.S. Ser. No. 15/974,520 and U.S. Ser. No. 15/974,541, both of which are filed concurrently herewith and are incorporated herein by reference for all purposes.

FIELD OF THE INVENTION

This invention relates to managing nodes in mesh networks, and in particular to managing connectivity for critical path nodes.

BACKGROUND

A PAN architecture may have a hysteresis in network topology to prevent thrashing when there is a temporary disruption in the network, such as a temporary loss of backhaul connection. However, some systems and devices cannot tolerate a temporary loss of backhaul connection and need to switch PANs once the backhaul connection becomes unavailable.

Generally, a root node does not routinely communicate the status of the backhaul connection to the other nodes in the PAN. Instead, each node has to determine the state of the backhaul connection by sending upper layer messages and receiving a response from the backhaul. Since a node cannot send an upper layer message until it joins a PAN, a node cannot determine the status of the backhaul connection prior to joining. A node that requires a backhaul connection may join a PAN and then determine that a backhaul connection is unavailable.

A node that determines that the backhaul connection for its current PAN is unavailable, may determine that it needs to switch PANs. However, the node may not have direct visibility to another PAN, which may delay the switch to a different PAN.

When a node switches PANs, any child nodes remain with the current PAN by finding a new parent node or switch to the new PAN by unjoining the current PAN and joining the new PAN. This process is time consuming and causes the child node to be unavailable until it locates a new parent or completes the unjoining/joining process.

SUMMARY

Aspects of the invention provide improvements to the way that a node determines the status of a backhaul connection and joins or switches to a PAN with an available backhaul connection. Additional aspects of the invention provide a more efficient way to switch PANs when a node has a child node. The node may bring its child node with it when it switches regardless of the reason for the switch.

A node may consider the status of a backhaul connection prior to joining a PAN. The node may be a critical node that requires an available backhaul connection. The status of the backhaul connection may be included in a layer 2 message, such as a beacon. In one example, backhaul status information is included in an information element in the beacon.

Once a critical node joins a PAN, a critical path may be established from the critical node to the root of the PAN. In one example, layer 3 messages, such as DAO messages are used to establish the critical path. Nodes along the critical path may seek to join a new PAN when the backhaul connection for the current PAN becomes unavailable.

When a node switches to a new PAN, it may coordinate the switch with its child nodes. The switching node identifies a new PAN and obtains timing synchronization information for the new PAN. The switching node sends timing synchronization information for the new PAN and a time for switching to the new PAN to its child nodes. The switching node and the child nodes maintain timing synchronization information for both the current PAN and the new PAN. At the time for switching, the switching node and its child nodes switch to the new PAN. A node may coordinate the switch to the new PAN with its child node whenever a switch occurs. The coordination is not limited to a switch based on a loss of a backhaul connection.

These illustrative aspects and features are mentioned not to limit or define the invention, but to provide examples to aid understanding of the inventive concepts disclosed in this application. Other aspects, advantages, and feature of the present invention will become apparent after review of the entire application.

BRIEF DESCRIPTION OF THE DRAWINGS

These and other features, aspects, and advantages of the present disclosure are better understood when the following Detailed Description is read with reference to the accompanying drawings, where.

DETAILED DESCRIPTION

The present invention is directed to systems and methods for managing nodes in mesh networks, including joining a critical node to a PAN, creating and maintaining a critical path, PAN switching by critical path nodes, and maintaining parent/child relationships when switching PANs. A critical node may consider the status of the backhaul connection for a PAN prior to joining the PAN. Once joined, a critical path from the critical node to the root is identified and nodes along the critical path, including the critical node, may attempt to join a new PAN if the backhaul connection for the current PAN becomes unavailable. The status of the backhaul connection for a PAN may be communicated in an information element (IE) in a beacon. If a critical path node is a parent node with one or more child nodes and it switches PANs, then the critical path node and the child nodes may switch PANs while maintaining their parent-child relationship. A parent node may maintain its parent-child relationship with its child node when it switches PANs for reasons other than a loss of a backhaul connection.

Critical Node and Critical Path

Figure 1:
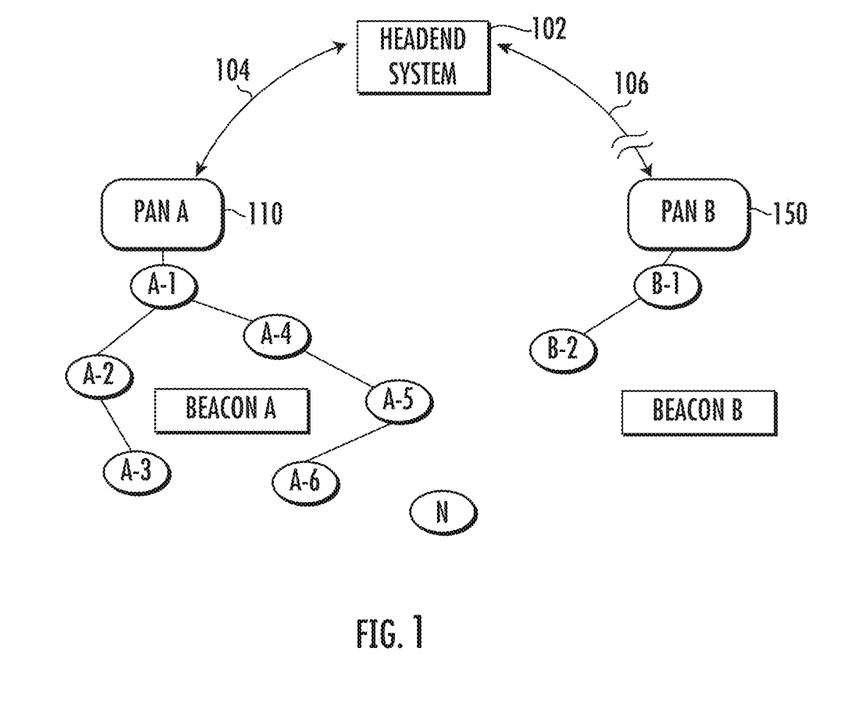
FIG. 1 illustrates two PANs and an unjoined critical node according to one aspect of the invention.

FIG. 1 illustrates two PANs, PAN A and PAN B. Node 110 is the root for PAN A and node 150 is the root for PAN B. PAN A includes nodes A-1 through A-6 and PAN B includes nodes B-1 and B-2. Backhaul connection 104 connects PAN A with a central system 102 and backhaul connection 106 connects PAN B with the central system. Although not shown in FIG. 1, there may be any number of intervening devices between a PAN and the central system 102.

Node 110 and node 150 monitor the status of their respective backhaul connections and include information about the status of their backhaul connections in their beacons. In one example, they determine whether they are connected to an NTP server and if so, determine that their backhaul connection is available. Other implementations may consider other factors to determine whether their backhaul connection is available or unavailable including, but not limited to, connection to a specific system or server or connection to a time source. Each node includes its current backhaul status information in an IE in its respective beacon. The IE may be a new IE or may be an existing IE. If an existing IE is used, then the backhaul status information may be appended to the IE. Any type of IE that includes backhaul status information is referred to herein as a backhaul status IE. The backhaul status information may be conveyed in one bit where a first value indicates that the backhaul connection is available and a second value indicates that the backhaul connection is unavailable or unknown. In some implementations, the backhaul status information includes additional information, such as how long the backhaul connection has been in its current state. For example, a timestamp indicating the time of the last status change may be used. In the example illustrated in FIG. 1, the backhaul connection 104 is available and the backhaul connection 106 is unavailable.

In FIG. 1, node N is a critical node that is not joined to either PAN. A critical node is a node that requires a backhaul connection. It may not be able to wait for the backhaul connection to reconnect if it becomes available. One example of a critical node is a node associated with DA (Distribution Automation) equipment, such as line sensors, switches, and re-closers. A node may be designated as a critical node upon installation or may be designated as a critical node after installation.

Node N receives Beacon A from PAN A and Beacon B from PAN B. In this example, Beacon A includes a backhaul status IE that indicates that backhaul connection 104 is available and Beacon B includes a backhaul status IE that indicates that backhaul connection 106 is unavailable. Since node N is a critical node, it joins PAN A. Critical nodes may be configured to avoid joining a PAN with an unavailable backhaul connection, even though other factors, e.g., rank, load, etc. may be favorable to joining the PAN.

Figure 2:
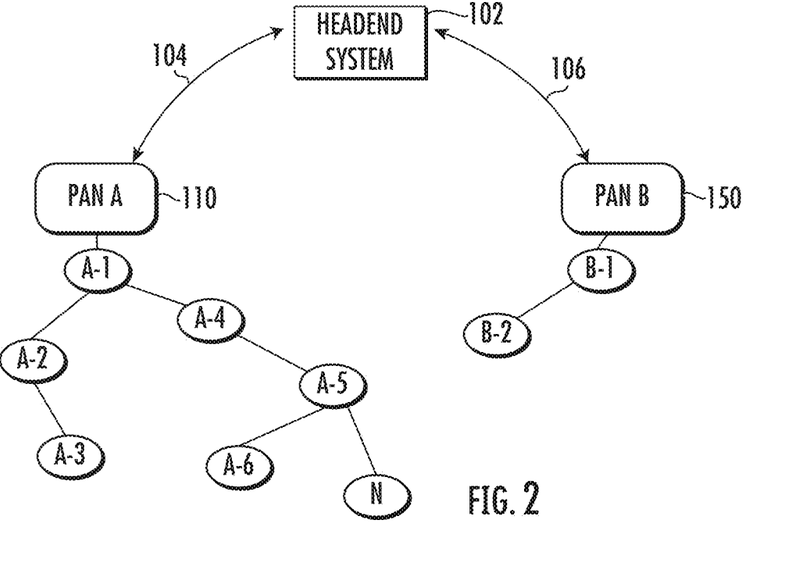
FIG. 2 illustrates a critical node joined to a PAN according to one aspect of the invention.

FIG. 2 illustrates PAN A after node N joins. After node N joins, it sends a DAO message that identifies node N as a critical node. In one example, node N sets a bit in the DAO flag field to indicate that it is a critical node. Based on the DAO message, node 110, which is the root for PAN A, determines a critical path for node N and stores information describing the critical path for node N, i.e., the path including node N, node A-5, node A-4, and node A-1. The root may send a DAO-ACK message to Node N with a bit set to indicate that a critical path is in place.

In some implementations, as each node between the root and Node N receives the DAO-ACK message, the node checks the bit and determines that it is a critical path node. If a node does not support critical path nodes, then after it receives the message, it does not forward the message. Instead, it may discard the message or send an error message.

Node N may use other types of messages or other fields to indicate that it is a critical node including, but not limited to an indication in a hop-by-hop extension header of an IPv6 message. In one example, Node N sets a bit in a hop-by-hop extension header to indicate that it is a critical node and is requesting a critical path. When node A-5 supports critical path nodes, it receives the message, checks the bit, enters a pre-critical path state, and forwards the message to the next node. This process repeats until the message reaches the root of PAN A. When the root sends a message back to Node N indicating that a critical path is in place, the nodes between the root and Node N may examine the message and transition from a pre-critical path state to a critical path state.

Since PAN A may be a wireless mesh network, the critical path for node N may change. If the critical path changes, then the critical path for node N may include additional or different nodes. The critical path information maintained by the root and the critical path status of each node affected by the change are updated to reflect the change in the critical path.

After node N joins PAN A, it generates and sends beacons that include a backhaul status IE. Node N obtains the information for the backhaul status IE from the beacons that it receives from its parent node A-5 or other nodes in PAN A.

Loss of Backhaul Connection and Critical Path

Figure 3:
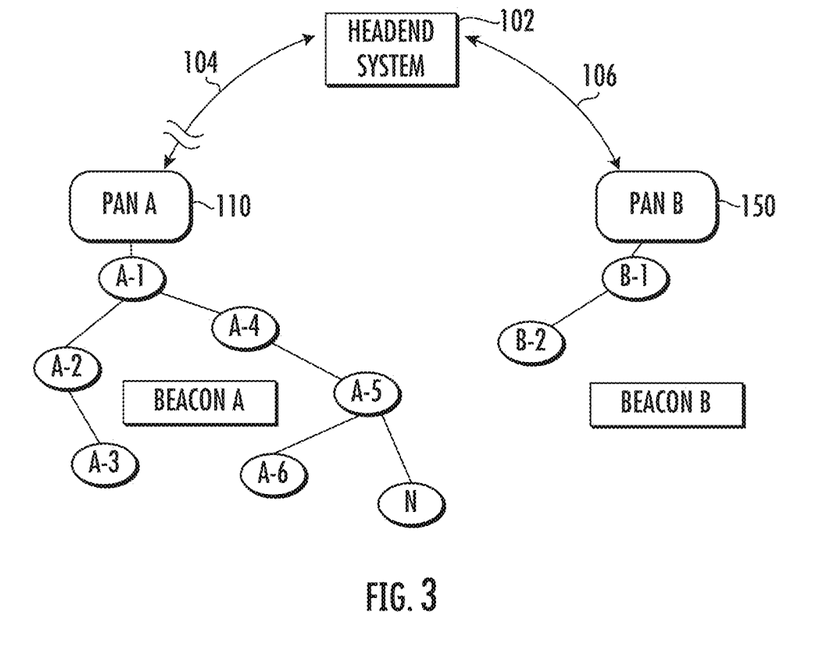
FIG. 3 illustrates a loss of a backhaul connection for a PAN according to one aspect of the invention.
Figure 4:
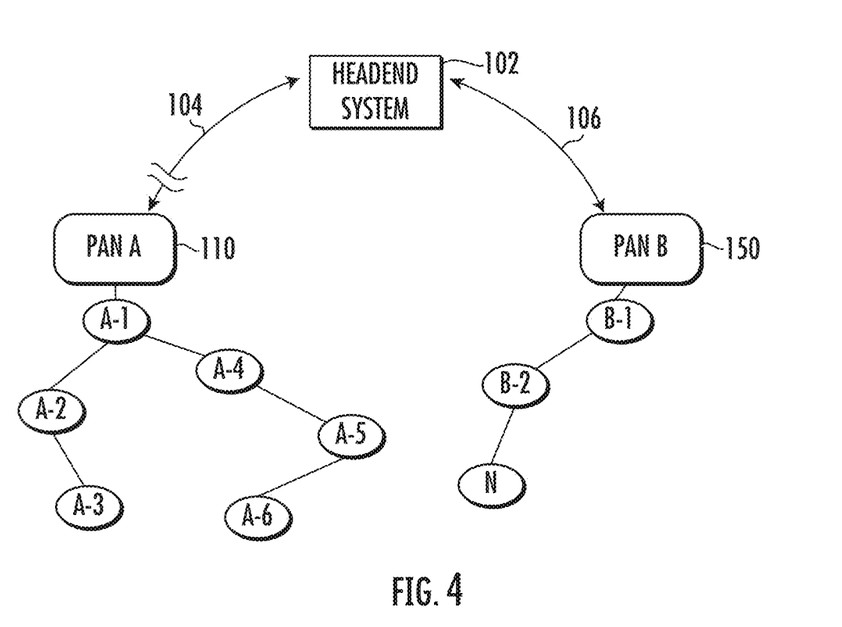
FIG. 4 illustrates a critical node switching to a different PAN according to one aspect of the invention.

FIG. 3 illustrates the scenario where PAN A's backhaul connection becomes unavailable and PAN B's backhaul connection is available. When node 110 detects that its backhaul connection is unavailable, then it may generate a beacon, Beacon A, that includes backhaul status information in the backhaul status IE. The information regarding the status of the backhaul connection is propagated through the network until node N receives a beacon with a backhaul status IE indicating that the backhaul connection for PAN A is unavailable. Since node N is a critical node, it may begin searching for a new PAN to join once it determines that the backhaul connection for its current PAN is unavailable. If node N receives a beacon from a different PAN, such as Beacon B from PAN B, it may consider whether the backhaul connection for PAN B is available when determining whether to switch PANs. If it decides to switch PANs, then it may follow a similar process to that described above in connection with FIGS. 1 and 2 for joining PAN B. In this instance, the other nodes joined to PAN A may remain joined to PAN A, as shown in FIG. 4.

When node N joins PAN B, its parent node, node A-5 determines that node N is no longer a child node. In one example, node N sends a disassociation message to node A-5 prior to joining PAN B to inform node A-5 of the switch. Node N determines whether it has any other child nodes that are critical nodes or critical path nodes. If it does not have any other child nodes that are critical nodes or critical path nodes, then it determines that it is no longer on a critical path and sends a DAO message indicating that it is no longer a critical path node. Similarly, if node A-4 has no child nodes that are critical nodes or critical path nodes, then it sends a DAO message indicating that is it no longer a critical path node. If node A-1 has no child nodes that are critical nodes or critical path nodes, then it sends a DAO message to its parent node, node 110, and node 110 removes the critical path for node N. Node A-5 may remain a critical path node if it has another child node, e.g. Node A-6, that is a critical node or critical path node. In this situation, node 110 stores critical path information for Node A-6. Once a node, e.g. node A-5, is no longer a critical path node, then it may remain joined to its current PAN or switch to a target PAN based on factors other than the status of the backhaul connection for its current PAN and a target PAN.

In some instances, a critical node may only rarely receive a beacon from another PAN. Once a node on the critical path receives a beacon from another PAN with an available backhaul connection while the backhaul connection for the current PAN is unavailable, it may switch PANs. For example, if node A-5 receives a beacon from node A-4 or another node in PAN A with a backhaul status IE indicating that the backhaul connection for PAN A is unavailable, then node A-5 may search for a different PAN to join. Since node A-5 is on a critical path, it may be more aggressive in seeking a different PAN than if it weren't on a critical path. In some implementations, the node considers its RPL layer in determining how aggressively to seek a different PAN. For example, a layer 1 node may be less aggressive than a lower layer node.

Figure 5:
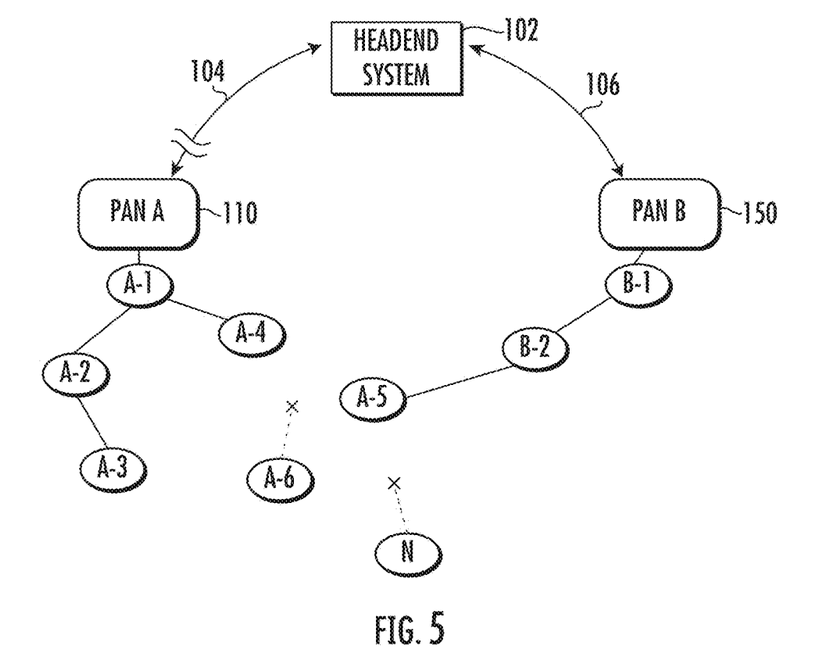
FIG. 5 illustrates a parent node switching to a different PAN according to one aspect of the invention.

If node A-5 receives a beacon from a different PAN, such as Beacon B from PAN B, it may determine whether to switch PANs based on whether the backhaul connection for PAN B is available. When the backhaul connection for PAN B is available, node A-5 joins PAN B, as shown in FIG. 5. FIG. 5 illustrates that after node A-5 joins PAN B, its child nodes, node A-6 and node N may not be joined to either PAN A or PAN B. Since node A-5 is not a critical node and does not have a child node that is a critical node in FIG. 5, it does not identify itself as a critical node or a critical path node after joining PAN B. In some implementations, node A-6 and node N each execute a separate joining process. Each node may rejoin PAN A by finding a new parent node, join PAN B through node A-5 (its PAN A parent node), or join PAN B by finding a different parent node. Since node N is a critical node and the backhaul connection for PAN A is unavailable, node N joins PAN B. In the scenario where node N joins PAN B as a child node of node A-5, node N sends a DAO message that identifies node N as a critical node. A critical path is established in a manner similar to that discussed above in connection with FIG. 2.

In some implementations, a secondary backhaul connection, such as Ethernet or cellular, may be available. If so, when a critical path node receives a beacon with a backhaul status IE indicating that the backhaul connection is unavailable, then the node may choose to remain on the current PAN and use the secondary backhaul connection.

If the backhaul status IE indicates that the backhaul connection is unavailable and includes information about how long the backhaul connection has been unavailable, then a critical path node may consider how long the backhaul connection has been unavailable when determining when to switch to a new PAN.

Although the foregoing examples discuss the use of the backhaul status IE in connection with critical nodes, the backhaul status IE may be used whenever backhaul status information is useful. It is not limited to use by critical path nodes.

Maintaining Parent-Child Relationship when Switching PANs

A node may maintain existing parent-child relationships when it switches to a new PAN. The switch may occur because a backhaul connection is lost or for any other reason.

Figure 6:
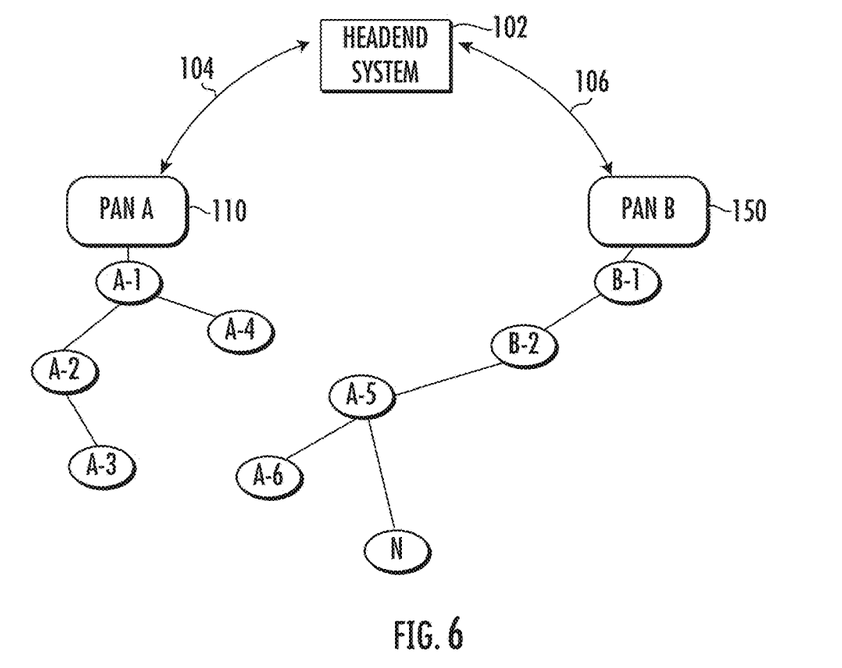
FIG. 6 illustrates a parent node and its child nodes switching to a different PAN according to one aspect of the invention.

Continuing with the example of FIG. 3, node A-5 may bring its child nodes with it when it joins PAN B. Once node A-5 determines that it is going to switch to a target PAN, then the node maintains timing synchronization information for both its current PAN, e.g. PAN A, and its target PAN, e.g., PAN B. Node A-5 obtains the timing synchronization information for the target PAN from a beacon in the target PAN. Node A-5 communicates the timing synchronization information for the target PAN to its child nodes node A-6 and node N, as well as a time when it plans to switch to the target PAN. The timing synchronization information and the switch time may be communicated in a beacon from node A-5. For example, IEs in the beacon currently provide information about the network and include absolute slot number, channel hopping sequence, and timeslot offset information. An IE in the beacon may be modified to include a PAN switching timestamp. Only nodes that recognize node A-5 as their parent node may act upon the timing synchronization information and the switch time. Once nodes A-6 and node N receive the beacon with the timing synchronization information and the switch time, the nodes maintain timing synchronization information for both PAN A and PAN B. At the switch time, node A-5 and its child nodes, node A-6 and node N, switch from PAN A, as shown in FIG. 3, to PAN B, as shown in FIG. 6. After the switch, node A-5 may send a DIS message to node B-2 to trigger a DIO message from node B-2. In response to the DIO message, node A-5 may send a DAO message that indicates that its child node, node N, is a critical node and that node A-5 is on a critical path. Once node A-5 receives a DAO-ACK message, it may send a DIO message to its child nodes that it brought from PAN A, e.g., node A-6 and node N, via a unicast, multicast, or broadcast method so that the child nodes may obtain a new network prefix.

After the nodes switch to PAN B, the critical path includes node A-5, node B-2, node B-1, and node 150. By switching node A-5, node A-6, and node N to the target PAN together, the timing and network connectivity are maintained and the availability of the child nodes, e.g., node A-6 and node N, is improved.

The parent-child relationship between nodes may be maintained when the parent node determines that it is switching to a target PAN for any reason. It is not limited to the situation where the parent node is a critical path node or when the switch is based on a backhaul connection status.

Communications Between Critical Node and PAN

Figure 7:
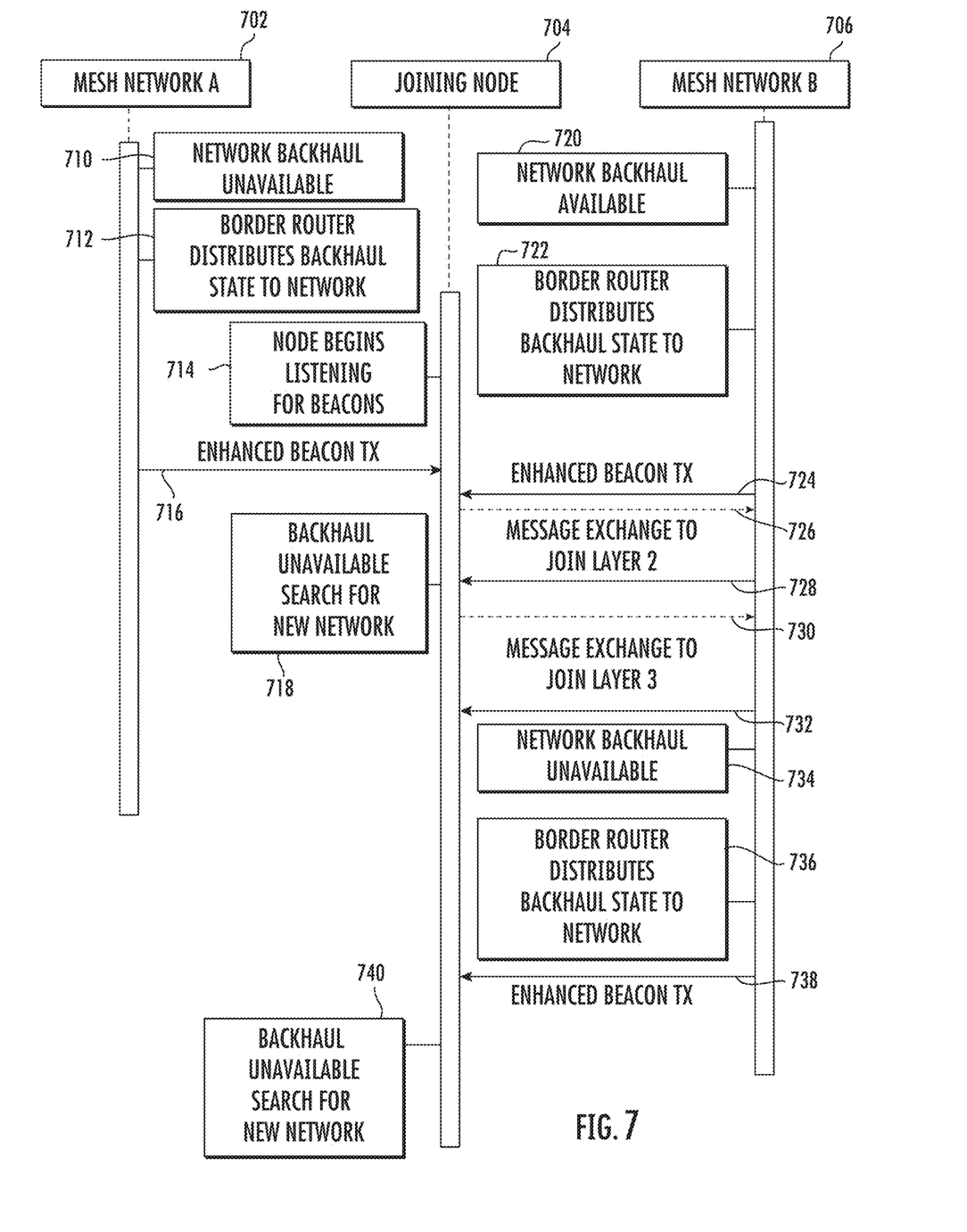
FIG. 7 illustrates communications between a joining node and two PANs according to one aspect of the invention.

FIG. 7 illustrates a critical node 704 seeking to join a PAN. The node 704 initially determines whether to join a PAN corresponding to mesh network 702. At 710, the backhaul connection for network 702 becomes unavailable. Subsequently at 712, the border router or root node for network 702 communicates the loss of backhaul connection to the network. In one example, the border router sends a beacon with a backhaul status IE indicating that the backhaul connection is unavailable. Critical node 704 begins listening for beacons at 714 to find a network to join. At 716, node 704 receives a beacon from network 702. The beacon includes a backhaul status IE indicating that network 702 has lost its backhaul connection. Since node 704 is a critical node, it continues to listen for additional beacons to find a network with an available backhaul connection.

At 720, the backhaul connection for a PAN corresponding to mesh network 706 is available. At 722, the border router for network 706 communicates the availability of the backhaul connection to the network. In one example, the border router sends a beacon with a backhaul status IE indicating that the backhaul connection is available. At 724, node 704 receives a beacon from network 706. Since the beacon from network 706 indicates that the backhaul connection is available, node 704 determines that it will try to join network

706. Node 704 and network 706 conduct a message exchange 726, 728 at layer 2. The message exchange may include an association request and an association response message. Other types of message exchanges are also possible. Once joined at layer 2, node 704 and network 706 conduct another message exchange at layer 3. For example, node 704 may send a DAO message indicating that it is a critical node and a node within network 706 may respond with a DAO-ACK message.

At 734, the backhaul connection for network 706 becomes unavailable. Subsequently at 736, the border router for network 706 communicates the loss of backhaul connection to the network. At 738, a beacon from network 706 indicates that the backhaul connection for network 706 is unavailable. In response to receiving the beacon, node 704 begins searching for a new PAN at 740.

Although FIG. 7 uses a beacon to communicate backhaul status information, other implementations may use a different type of message including, but not limited to, another type of layer 2 message or a propriety frame.

Exemplary Node

Figure 8:
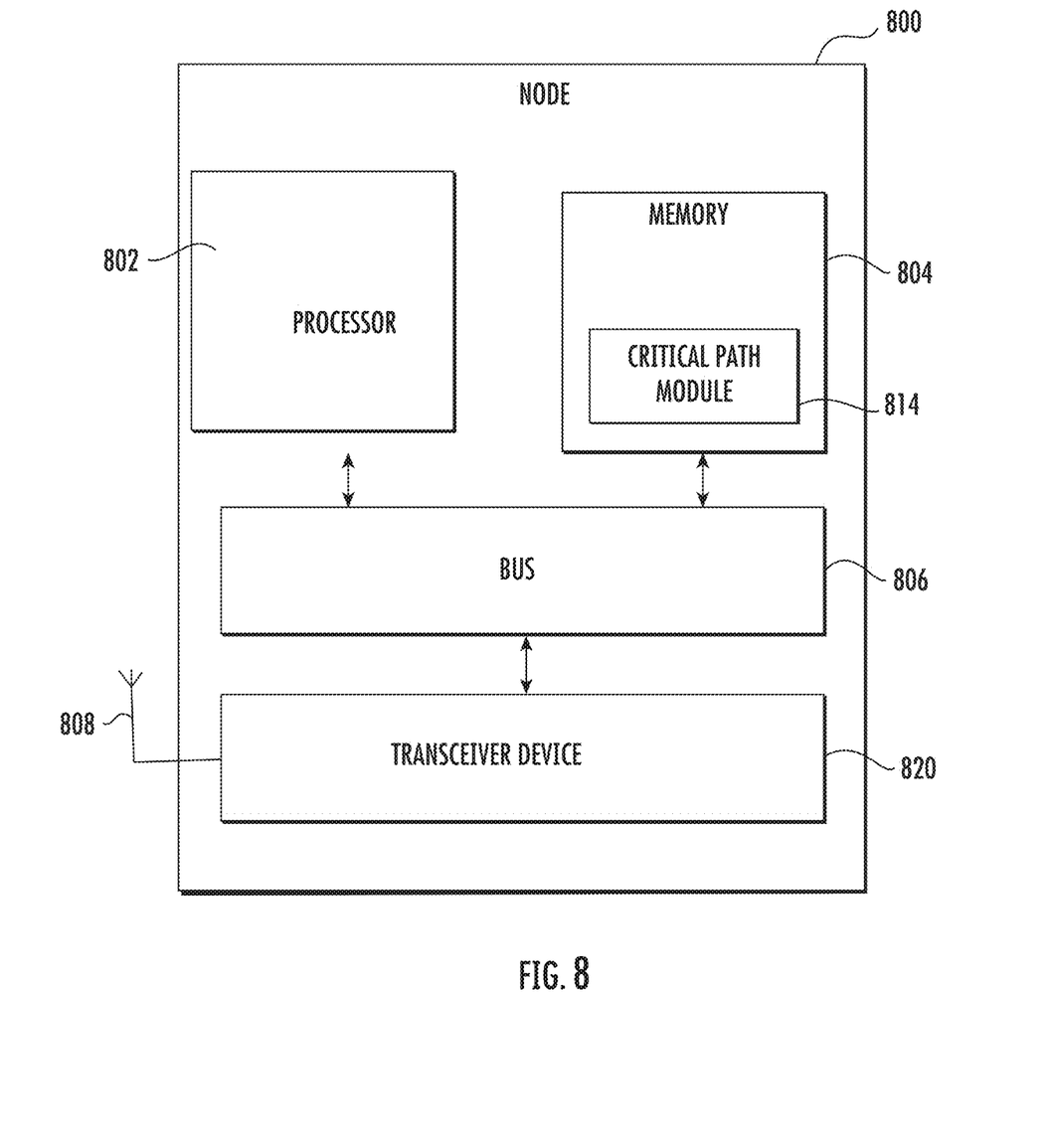
FIG. 8 illustrates an exemplary node according to one aspect of the invention.

FIG. 8 illustrates an exemplary node 800. The node may include a processor 802, memory 804, and a transceiver device 820 each communicatively coupled via a bus 806. The components of node 800 can be powered by an A/C power supply or a low energy source, such as a battery (not shown). The transceiver device 820 can include (or be communicatively coupled to) an antenna 808 for communicating with other nodes. In some examples, the transceiver device is a radio-frequency ("RF") transceiver for wirelessly transmitting and receiving signals.

The processor may include a microprocessor, an application-specific integrated circuit ("ASIC"), a state machine, a field programmable gate array ("FPGA") or other suitable computing device. The processor can include any number of computing devices and can be communicatively coupled to a computer-readable media, such as memory 804. The processor can execute computer-executable program instructions or access information stored in memory to perform operations, such as those described herein. The instructions may comprise processor-specific instructions generated by a compiler and/or an interpreter from code written in any suitable computer-programming language. When instructions, such as those provided in a critical path module 814, are executed, they may configure the node to perform any of the operations described herein. Although the processor, memory, bus, and transceiver device are depicted in FIG. 8 as separate components in communication with one another, other implementations are possible. The systems and components discussed herein are not limited to any particular hardware architecture or configuration.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modification, variations, and/or additions to the present subject matter as would be readily apparent to one of ordinary skill in the art.

What is claimed is:

1. A method to join a node to a network, comprising:
   receiving a first beacon from a first network that includes an indication of a status of a backhaul connection between the first network and a central system;
   analyzing the first beacon to determine whether the backhaul connection between the first network associated with the first beacon and the central system is available;
   when the backhaul connection for the first network associated with the first beacon is not available, then continuing to listen for additional beacons;
   receiving a second beacon from a second network that includes an indication of a status of a backhaul connection between the second network and the central system;
   analyzing the second beacon to determine whether the backhaul connection between the second network associated with the second beacon and the central system is available; and
   when the backhaul connection for the second network associated with the second beacon is available, then joining the second network associated with the second beacon by:
   sending a first message to join the second network associated with the second beacon; and
   after joining the network, sending a second message indicating that the node is a critical node that requires the backhaul connection between the second network and the central system.

2. The method of claim 1, further comprising:
   receiving, by a root node, a third message corresponding to the second message, wherein the third message includes identifying information for each node between the node and the root node that forwarded a message corresponding to the second message; and
   identifying, by the root node, a critical path using the identifying information in the third message.

3. The method of claim 1, further comprising:
   receiving a third beacon;
   analyzing the third beacon to determine whether the backhaul connection for the second network is available; and
   when the backhaul connection for the second network is unavailable, then searching for another network.

4. The method of claim 3, further comprising:
   receiving a fourth beacon;
   analyzing the fourth beacon to determine whether a backhaul connection for a network associated with the fourth beacon is available; and
   when the backhaul connection for the network associated with the fourth beacon is available, switching from the second network to the network associated with the fourth beacon.

5. The method of claim 4, further comprising:
   transmitting a DAO (Destination Advertisement Object) message indicating that the node switched to the network associated with the fourth beacon.

6. The method of claim 1, wherein the second message is a DAO (Destination Advertisement Object) message and an indication that the node is the critical node is provided by a DAO flag.

7. A method performed by a node joined to a network, comprising:
   transmitting a beacon that includes information indicating that a backhaul connection between the network and a central system is available;
   receiving a message from a second node seeking to join the network;

joining the second node to the network, wherein the second node is joined as a child node to the node;

receiving a second message from the second node indicating that the second node is a critical node that requires the backhaul connection between the network and the central system or that the second node is on a critical path between a third node that is a critical node that requires the backhaul connection between the network and the central system and a root node for the network; and in response to receiving the second message, determining that the node is on the critical path.

8. The method of claim 7, further comprising:

receiving a second beacon that includes information indicating that the backhaul connection for the network is unavailable; and searching for another network.

9. The method of claim 7, further comprising:

receiving a second beacon that includes information indicating that the backhaul connection for the network is unavailable;

receiving a third beacon that includes information indicating that a backhaul connection for a second network is available; and switching from the network to the second network.

10. The method of claim 7, further comprising:

determining that the second node is no longer a child node;

in response to determining that the second node is no longer a child node, determining whether any other child nodes are critical nodes or critical path nodes; and when no other child nodes are critical nodes or critical path nodes, determining that the node is no longer on the critical path.

11. The method of claim 7, wherein the second message is a DAO (Destination Advertisement Object) message and an indication that the second node is the critical node is provided by a DAO flag.

12. The method of claim 7, wherein the second message is an IPv6 message and an indication that the second node is the critical node is provided in a hop-by-hop extension header.

13. A node joined to a network, comprising:

a processing device;

a network interface capable of communicating on the network; and a memory configured by a critical path module, wherein execution of the critical path module configures the node to:

receive a message from a second node seeking to join the network;

join the second node to the network, wherein the second node is joined as a child node to the node;

receive a second message from the second node indicating that the second node is a critical node that requires a backhaul connection between the network and a central system or that the second node is on a critical path between a third node that is a critical node that requires the backhaul connection between the network and the central system and a root node for the network; and in response to receiving the second message, determine that the node is on the critical path.

14. The node of claim 13, wherein execution of the critical path module further configures the node to:

receive a beacon, wherein the beacon indicates that a backhaul connection for the network is unavailable;

receive a second beacon associated with a second network, wherein the second beacon indicates that a backhaul connection for the second network is available; and switching from the network to the second network.

15. The node of claim 14, wherein execution of the critical path module further configures the node to:

prior to switching from the network to the second network, determining a logical distance from a root node for the network.

16. The node of claim 13, wherein the second message is a layer 3 message.

17. The node of claim 13, wherein execution of the critical path module further configures the node to:

determine that the second node is no longer a child node;

in response to determining that the second node is no longer a child node, determine whether any other child nodes are critical nodes; and when no other child nodes are critical nodes, determine that the node is no longer on the critical path.

* * * * *